(12) United States Patent
Steinich

(10) Patent No.: US 6,543,152 B1
(45) Date of Patent: Apr. 8, 2003

(54) MEASURING CABLE TRAVEL SENSOR

(75) Inventor: Klaus-Manfred Steinich, Poering (DE)

(73) Assignee: ASM Automation Sensorik Messtechnick & GmbH, Unterhaching (DE)

( * ) Notice: Subject to any disclaimer, the term of this patent is extended or adjusted under 35 U.S.C. 154(b) by 0 days.

(21) Appl. No.: 09/468,820

(22) Filed: Dec. 22, 1999

(30) Foreign Application Priority Data

Dec. 22, 1998 (DE) .......................... 198 59 444

(51) Int. Cl.[7] .................. G01B 3/00; G01B 3/10; G01B 3/12; B65H 61/00
(52) U.S. Cl. .................. 33/733; 33/756; 33/DIG. 1; 33/740
(58) Field of Search .................. 33/755, 756, 732, 33/733, 740, 742, 767, DIG. 1; 242/396, 422.2

(56) References Cited

U.S. PATENT DOCUMENTS 6,029,951 A * 2/2000 Guggari ................ 254/269
6,154,975 A * 12/2000 Steinich ................ 33/756
6,168,107 B1 * 1/2001 Bishop et al. ........... 33/756

FOREIGN PATENT DOCUMENTS

| DE | 69104261 T2 | 3/1995 |
| DE | 29803178 U1 | 7/1998 |
| DE | 69413496 T2 | 6/1999 |

* cited by examiner

Primary Examiner—Diego Gutierrez
Assistant Examiner—Yaritza Guadalupe
(74) Attorney, Agent, or Firm—Crowell & Moring LLP

(57) ABSTRACT

A measuring cable travel sensor includes a housing accommodating a measuring cable drum and a rotary spring urging the cable drum in the direction of winding of a measuring cable thereon. At least one braking magnet is arranged either on the cable drum or on the housing to provide for magnetic control of the rotary movement of the cable drum at least in the cable winding-on direction. The cable drum may also carry holding magnets for holding the winding cable into close contact with the peripheral surface of the cable drum. The housing may also have a band extending at least in part around the cable drum for correctly positioning the cable thereon as it is being wound on.

4 Claims, 16 Drawing Sheets

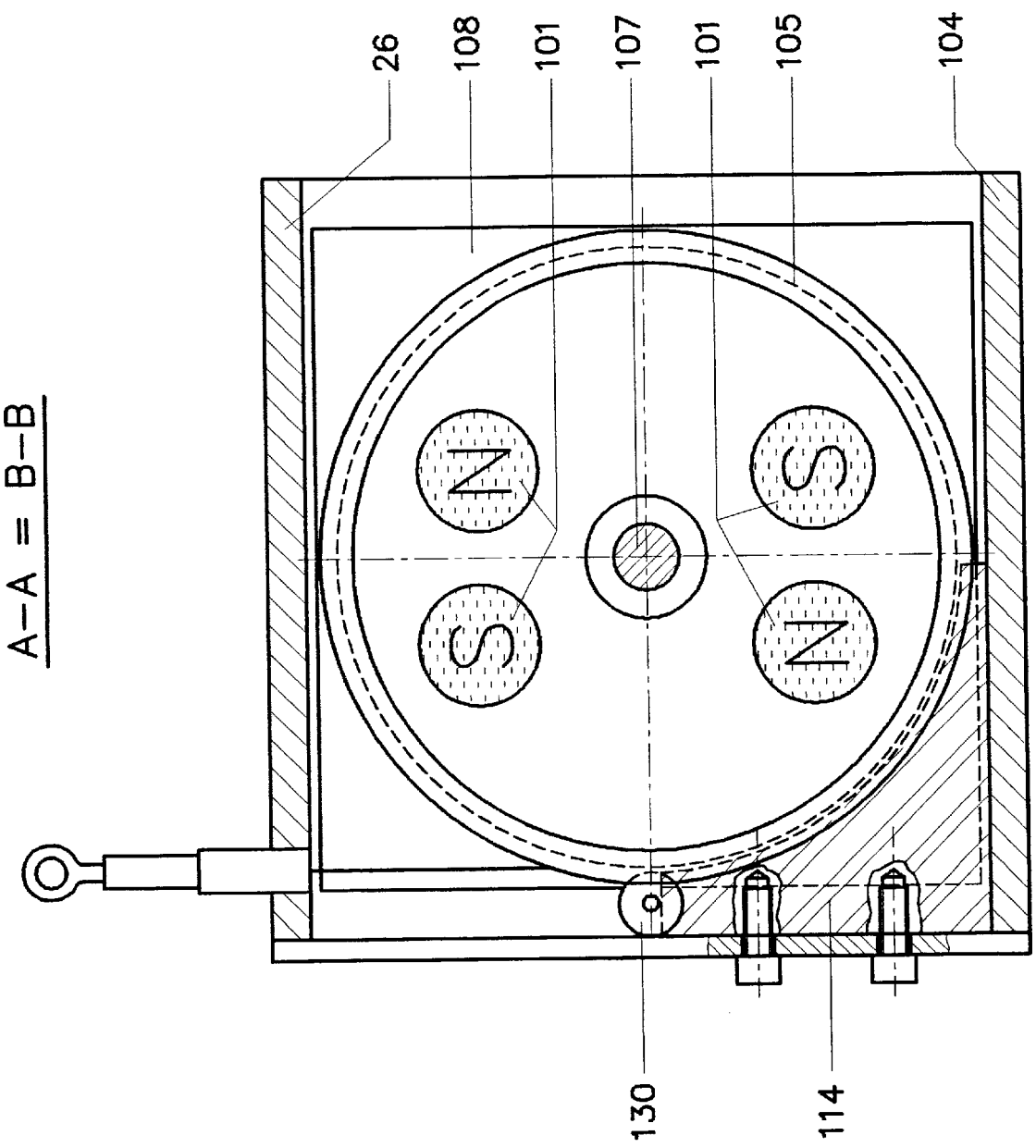

101   5   105  107  104

MEASURING CABLE TRAVEL SENSOR

BACKGROUND AND SUMMARY OF THE INVENTION

1. Field of the Invention

The invention concerns a measuring cable travel sensor and more particularly a measuring cable travel sensor having a braking device.

2. Discussion of the Background

Measuring cable travel sensors occur in many different configurations for example for determining the precise position of a given component which in particular can move over considerable travel distances, for example the cabin of an elevator. A typical measuring cable travel sensor of that kind and for that purpose has a pull element such as a measuring cable which is wound on a cable drum which is biassed in the cable winding-on direction. The free end of the measuring cable is connected to that component whose position is to be determined, for example as mentioned above an elevator cabin. The prestressing force for urging the cable drum in the winding-on direction is produced for example by way of a flat spiral spring which for example is arranged coaxially with respect to the cable drum and is non-rotatably connected thereto.

The cable drum is also typically coupled to a detection unit for recording the revolutions or angular distances through which the cable drum passes in the winding-on or unwinding direction, and which in addition by way of a suitable electronic evaluation system determines the length of the pull element or measuring cable which has been drawn off the cable drum.

In order to simplify that operation of determining the drawn-off length of the measuring cable and to ensure an accurate measurement result, the measuring cable is wound in only a single layer on the periphery of the cable drum, with the turns of the wound cable on the cable drum being disposed in axially juxtaposed relationship. As a result, one revolution of the cable drum will always correspond to exactly the same length of the pull element or measuring cable.

In order to ensure that the measuring cable is wound on to the drum in only a single layer and in order to prevent the measuring cable from jumping over on to the first layer to start to form a second layer there over when winding the measuring cable on to the cable drum, it is generally necessary to take suitable mechanical steps involving appropriate structure on the travel sensor to obviate this occurrence.

In that respect there is an additional difficulty insofar as such measuring cable travel sensors often have to be used in an adverse environment, for example involving a high level of fouling and contamination. For that reason the measuring cable travel sensor has to be disposed in a housing which affords sealing integrity, and the measuring cable which is passed out of the housing also has to be taken out of the housing by way of a cable guide passing through the wall of the housing, which also offers the greatest possible level of sealing integrity in relation to the cable.

In order to ensure that the measuring cable is wound on the cable drum in a neat and tidy fashion in a single layer, one possible way of achieving that is for the cable drum to be very short in its axial direction. If in addition the cable entrance is at a sufficient distance from the point on the cable drum at which the cable runs tangentially on to the cable drum, then the measuring cable, on moving from the cable entrance to the cable drum, runs only at such a slight degree of angular deflection as to still be acceptable, and such an arrangement automatically causes the cable drum which is biassed in the winding-on direction to have the measuring cable wrap there around in only a single layer.

However, measuring cable travel sensors of that kind suffer from two different difficulties which however are interrelated in terms of their origin, more specifically as follows:

In order to ensure measurement accuracy, the measuring cable has to be prestressed or biassed in the winding-on direction with a predetermined minimum force in any condition in terms of being wound on to or unwound from the cable drum and accordingly a suitably strong spring biassing effect is required to bias the cable drum in the winding-on direction.

The relatively strong spring biassing force applied to the cable drum serves inter alia to ensure that, even in the event of very fast movement on the part of the free end of the cable and the component to be measured, which is connected thereto, in a direction towards the cable drum, the measuring cable is wound on to the cable drum in a neat and tidy fashion by virtue of a sufficiently high biassing effect in the cable winding-on direction, independently of the speed with which the measuring cable is actually wound on to the drum.

Nonetheless, when the cable is wound on to the drum at very high speed, it can happen under some circumstances that the measuring cable can climb up or fly out, that is to say adopt a position at a spacing relative to the external peripheral surface of the cable winding drum, and in that case for example the measuring cable will jump over the first layer of turns already on the cable drum to form a second layer there over, being a phenomenon which is undesirable as it grossly falsifies the measurement result.

Attempts have already been made to prevent the measuring cable from climbing up over the previous turns already wound on the cable drum, for example by mechanical guide and tracking devices, distribution devices and so forth, but that tends to result in undesirable side effects such as wear, an increase in the winding force and the like, because of the mechanical friction involved.

Another detrimental effect of the high level of cable drum biassing is that, in the situation where the free end of the cable moves towards the cable drum more quickly than the cable drum can wind the measuring cable on to it or in the situation where the free end of the cable becomes detached from the component whose travel is to be measured so that the cable moves towards the cable entrance and into the travel sensor housing completely without any retardation force being applied to the cable, as a result the spring-biassed cable drum speeds up to very high speeds of rotation and at the end of the winding-on movement the free end of the cable which is usually of greater thickness and which is equipped with a fixing device for example using an eye strikes at very high speed against the cable entrance structure which is of smaller size in relation thereto. That can result in damage or even tearing of the measuring cable or can disrupt the connection between the measuring cable and its fixing device on the free end of the cable, and so forth.

SUMMARY OF THE INVENTION

An object of the present invention is to provide a measuring cable travel sensor in which, in spite of a sufficiently strong biassing effect on the cable drum in the cable winding-on direction, excessive acceleration of the cable drum in a winding-on procedure can be reliably prevented.

Another object of the present invention is to provide a measuring cable travel sensor of such a structure as to prevent the cable from climbing up on to cable turns already on the drum in a winding-on movement of the drum.

Still another object of the present invention is to provide a measuring cable travel sensor which while being of a simple structural configuration can provide for satisfactory winding-on and unwinding of the cable under properly controlled conditions, thereby to contribute to an enhanced service life for the measuring cable travel sensor.

In accordance with the principles of the present invention the foregoing and other objects of the invention are attained in a first aspect by a measuring cable travel sensor including a measuring cable and a cable drum having a winding cylinder with an external winding surface, for the measuring cable to be wound on to the external winding surface of the cable drum. The cable drum is mounted in a housing. The travel sensor further includes at least one retardation or braking magnet which is so arranged at a point that is non-rotatable with the cable drum that it has a magnetic retardation or braking action in contact-less manner in opposite relationship to the direction of winding-on rotation of the cable drum on the cable drum at an eccentric region of action thereon. At least in the region of action the cable drum includes electrically conductive material.

In accordance with the principles of the present invention the foregoing and other objects of the invention are attained in a second aspect by a measuring cable travel sensor including a measuring cable and a cable drum having a winding cylinder with an external winding surface, for the measuring cable to be wound on to the external winding surface of the cable drum. The cable drum is mounted in a housing. At least one retardation or braking magnet is eccentrically arranged on the cable drum in such a way that it has a retardation or braking effect magnetically in contact-less manner on the housing in the direction of rotation. The housing is of electrically conductive material at least in the region of action of the magnet.

In accordance with the principles of the present invention the foregoing and other objects of the:invention are attained in a third aspect by a measuring cable travel sensor including a measuring cable and a cable drum having a winding cylinder with an external winding surface, for the measuring cable to be wound on to the external winding surface of the cable drum. The cable drum is mounted in a housing. The sensor further includes at least one holding magnet arranged at the cable drum radially within the external peripheral surface of the winding cylinder of the cable drum, for holding the measuring cable radially inwardly against the winding surface, wherein the measuring cable includes magnetisable material.

In accordance with the principles of the present invention the foregoing and other objects of the invention are attained in a fourth aspect by a measuring cable travel sensor including a measuring cable and a cable drum having a winding cylinder with an external winding surface, for the measuring cable to be wound on to the external winding surface of the cable drum. The cable drum is mounted in a housing. The sensor further includes a sliding band, for example a band of textile material, more particularly a sliding band or band of other slidable, non-abrasive material, which is passed around at least a part of the external periphery of the external winding surface of the cable drum, which external winding surface is partially or entirely movable with the measuring cable, the band being passed around the winding surface at a small spacing and/or in dragging or frictional relationship at the external periphery of the winding with the measuring cable, while the spacing or the contact pressure of the band against the measuring cable winding is adjustable.

As will become apparent from the description hereinafter of preferred embodiments of the invention, it is possible to limit the speed of rotary movement of the cable drum when the measuring cable is winding thereon to by the use of a contact-less magnetic braking assembly. The components involved in that structure are to comprise an electrically conductive material.

The braking moment is generated between an eccentrically disposed region of the cable drum, preferably a region which is in the proximity of the external periphery thereof, and a stationary point which is thus non-rotatable with respect to the cable drum, for example a part of the housing of the cable drum.

As the measuring cable is wound on to the cable drum on the radially outwardly disposed peripheral surface thereof, the magnets are preferably oriented in a longitudinal direction, that is to say parallel to the axis of rotation of the cable drum, between two components which are adjacent to each other in that axial direction.

In such an arrangement, by virtue of the rotary movement of the cable drum, and irrespective of the spacing of the retardation or braking magnet relative to the component to be influenced thereby, an eddy current is firstly produced in the component which carries the retardation or braking magnet. The consequence of that eddy current is a magnetic field which is closed by way of the portion which is not in the magnetic field, thereby producing a braking moment.

Besides the strength of the magnet used, the braking action is determined to a very great extent by the spacing between the magnet and the component to be influenced thereby, and it is for that reason that this spacing should preferably be adjustable.

The respective component which is to be subjected to the influence of the braking magnet must comprise electrically conductive material, for example aluminum. When the magnet or magnets are arranged on the cable drum, that increases the inertial mass thereof, and that therefore affords a further aspect of the invention which entails arranging the braking magnet or magnets at a stationary point for example on the housing. That would also remove the compulsion for the provision of at least a pair of braking magnets on the cable drum, as a single magnet results in a cable drum unbalance, and that arrangement also makes available more space for example for fitting a magnet holder for adjustability of the air gap.

A consideration which is in favour of arranging the magnet or magnets on the cable drum however is the possibility that the magnet or magnets can be used at the same time as a holding magnet or magnets, thus providing a functionally combined unit.

In this respect, in this specification the term holding magnet is used to denote a magnet which is intended to prevent the measuring cable from climbing up or rising away from the winding surface formed by the external surface of the winding cylinder portion of the cable drum, insofar as the material of the measuring cable, which for this purpose is necessarily magnetisable, is drawn radially inwardly by magnetic force towards that winding surface. Accordingly holding magnets of that kind have to be disposed radially within the winding surface on the cable drum, and preferably therefore fixed on the inside of the winding cylinder which consists of a thin material, preferably in turn distributed over the periphery of the cable drum. In this case also the recommendation is for the axis of magnetisation of the magnet or magnets to be oriented parallel to the axis of rotation of the cable drum, that is to say, it is recommended to provide a bar magnet, in particular a permanent magnet, which extends in the longitudinal direction of the cable drum.

In both cases the magnetic force can be increased by the provision of pole shoes or pole pieces, that is to say involving close contact of iron materials against at least one outside of the magnet, in order thereby to reduce the level of magnetic losses. Preferably, the arrangement does not involve any covering by a pole piece in that direction in which the field lines are required to pass into or out of the magnet freely. Therefore, primarily cup-shaped pole pieces are preferred, which in the case of the retardation or braking magnet are directed with their open side towards the component to be influenced by the magnetic effect and which, in the case of the holding magnet, are directed with their open side radially outwardly towards the measuring cable.

It is also possible to achieve an increase in the level of retardation or braking force by using rare earth magnets, that is to say magnets with components of samarium, cobalt, neodymium and/or boron. In particular rare earth magnets of that kind can be used to produce disk-shaped magnets whose magnetisation axis extends in parallel relationship to the thickness of the disk through the disk and/or which in that case can be magnetised differently in a sector-like configuration.

Disk-shaped magnets of that kind can be disposed in the constricted conditions in terms of space of measuring cable travel sensors, more easily than elongate bar magnets.

In particular such disk-shaped magnets can be accommodated in the end of screw threaded pins or bolts as magnet holders which, in the component carrying them, can be moved by screwing closer towards or further away from the component to be influenced by the magnetic effect, in order thereby to provide for adjustability of the desired effect.

As an alternative and/or supplemental to the holding magnet or magnets, as indicated above, it is further possible in accordance with the invention to pass around the outside periphery of the movable cable drum a sliding band or belt, in particular a textile band or belt or a felt band or belt or more particularly a belt of plastic material such as PE, POM or PTFE, which when the measuring cable is wound correctly on the cable drum does not involve any contact with the wound turns of the measuring cable or bears against them without applying any force thereto, but which in contrast applies a force to the measuring cable if it climbs up on to a previous turn already formed on the cable drum.

Further objects, features and advantages of the invention will be apparent from the description hereinafter of preferred embodiments of the invention.

DESCRIPTION OF PREFERRED EMBODIMENTS

Figure 1:
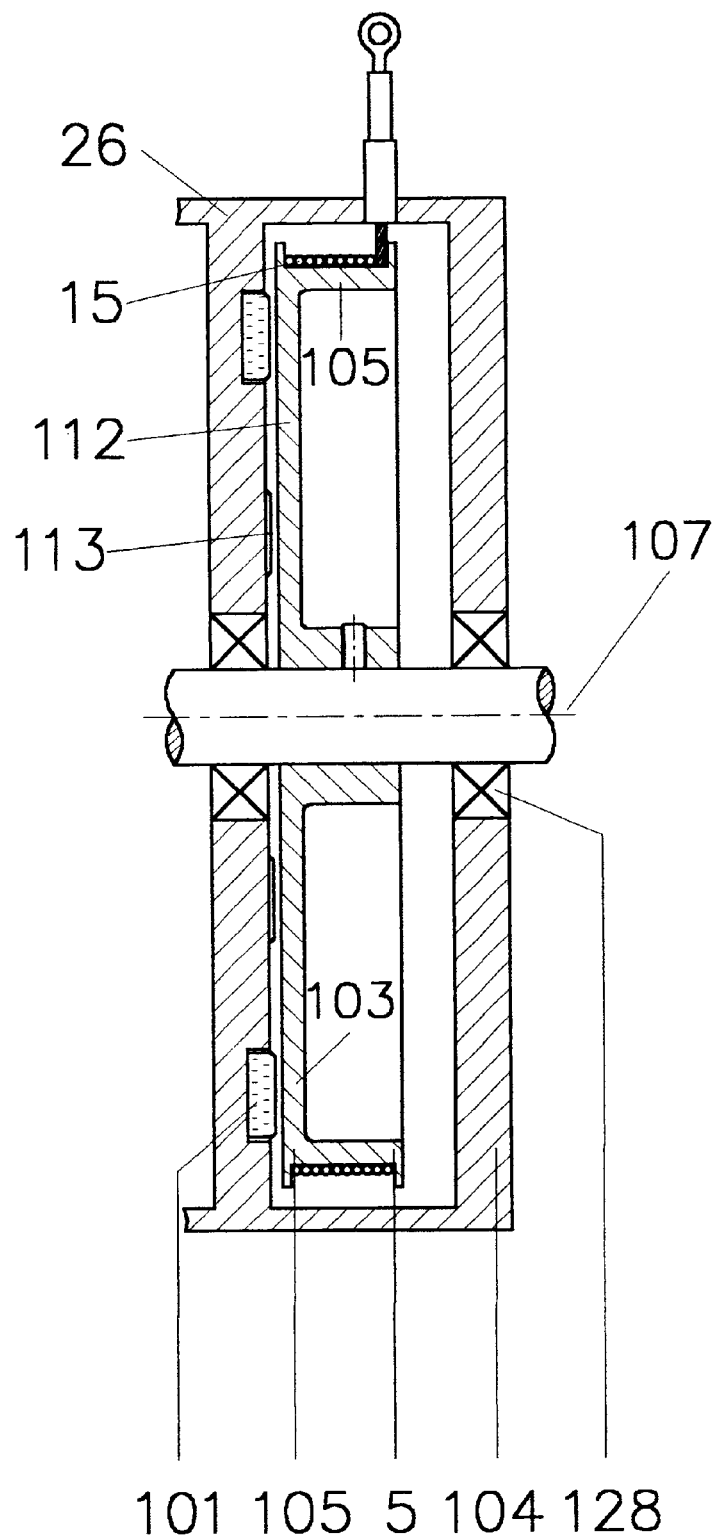
FIGS. 1a through 1d show sectional views through parts of various embodiments of the travel sensor according to the invention, with a housing with braking magnets arranged therein.
Figure 2:
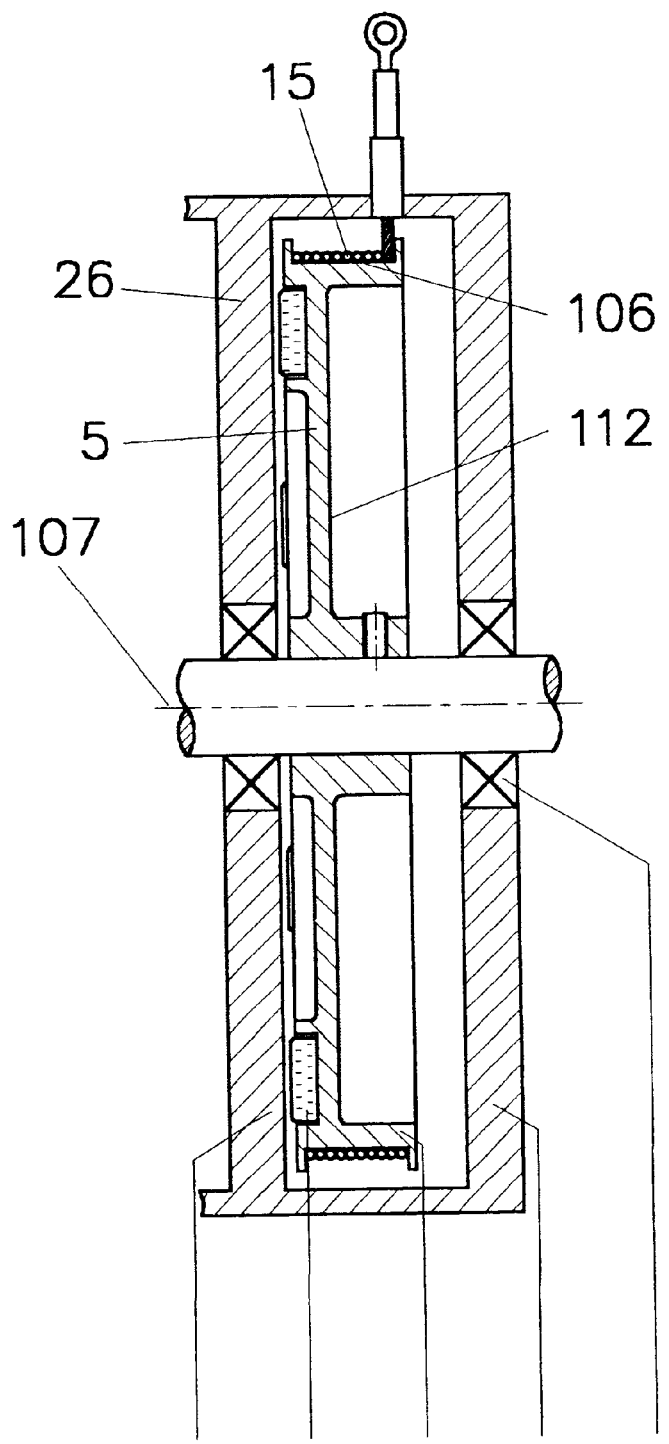
FIG. 2 shows an embodiment of the travel sensor according to the invention with braking magnets arranged on the cable drum.

Reference will now be made generally to FIGS. 1 and 2 which each show a respective embodiment of a measuring cable travel sensor according to the invention, comprising a rotatable cable drum 5 which is suitably fixed on a rotatable shaft and which can thus rotate about an axis of rotation as indicated at 107 in FIGS. 1 and 2. For that purpose the rotatable shaft is supported by means of bearings 128 in a housing which in the illustrated structure comprises a generally box-shaped, preferably closed profile member 26.

The cable drum 5 comprises a winding cylinder 105 with an external peripheral winding surface 106 which thus forms the external periphery of the winding cylinder 105. The winding cylinder 105 has radially outwardly facing abutments at each of the two ends thereof for limiting the arrangement of a measuring cable 15 which is to be wound on the winding surface 106. The winding cylinder 105 joins to the hub region of the winding drum 5 in a single step by way of individual spokes or a spoke disk as indicated at 112 for example in FIG. 1.

While in FIG. 1 the spokes or the disk 112 coincide with and are in alignment with the one axial end of the winding cylinder 105 and thus the cable drum 5 and are thus disposed closely adjacent to the wall of the housing member 26 which is at the left in FIG. 1, in the structure shown in FIG. 2 the spoke disk 112 is set back somewhat from the outer axial edge of the winding surface 106 of the winding cylinder 105.

In a corresponding manner, in FIG. 1 the at least one retardation or braking magnet which is indicated at 101 is arranged in that wall of the housing member 26, which is disposed at a small axial spacing in opposite relationship to the drum spoke disk 112, so that there is only a small air gap between the braking magnet or magnets 101 and the disk 112.

Figure 3:
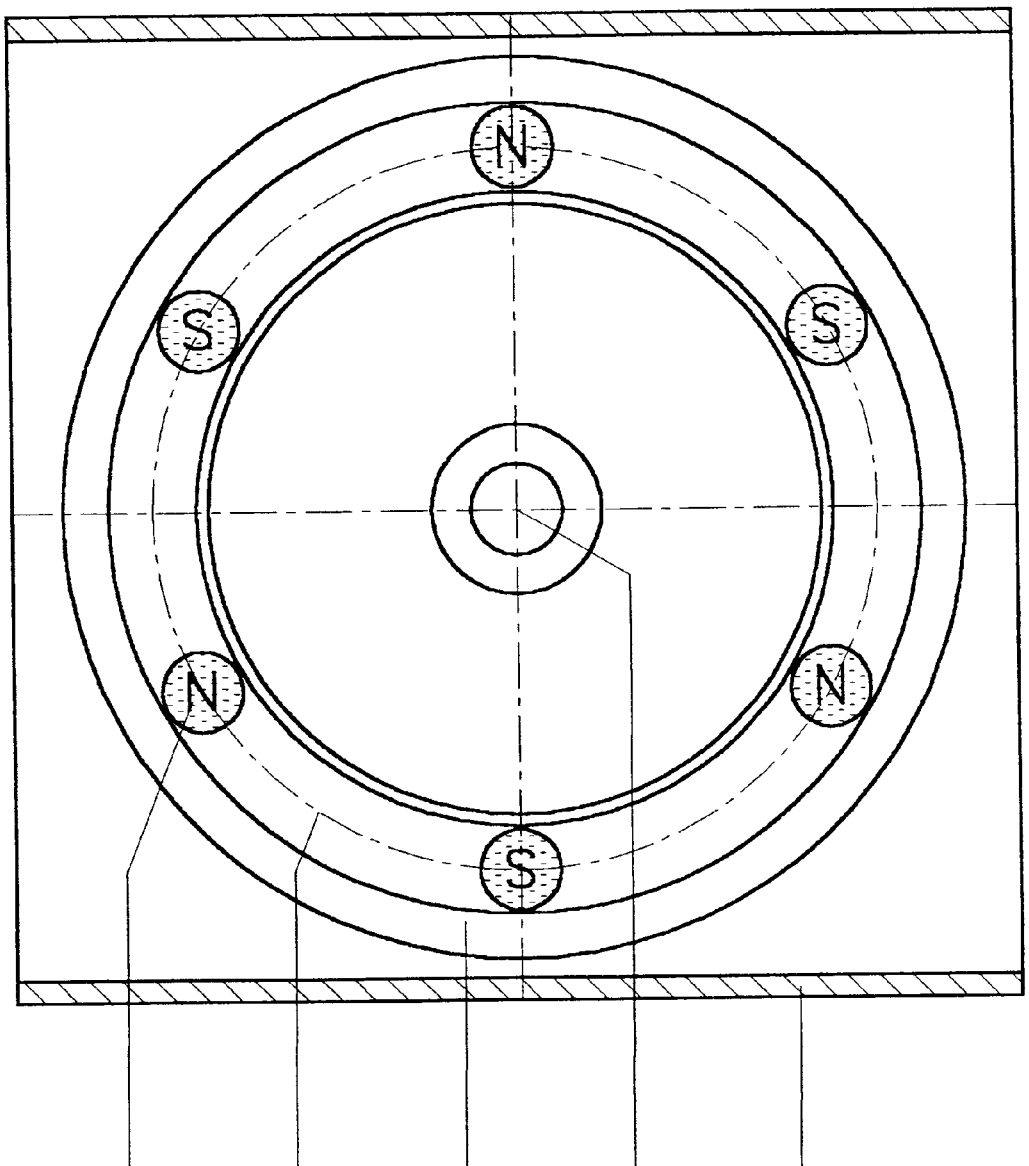
FIG. 3 is a front view of the FIG. 2 cable drum.

The braking magnet or magnets 101 are arranged in the radially outward region of the cable drum 5, adjacent to or in the region of the winding cylinder 105 thereof, being more specifically distributed over the periphery thereof, as can be seen from FIG. 3.

A raised portion on that wall of the housing member 104, indicated at 113, serves as a contact-preventing means, that is to say to prevent the cable drum 5 from adhering to the braking magnet or magnets 101 in the axial direction of the cable drum.

Figure 1A:
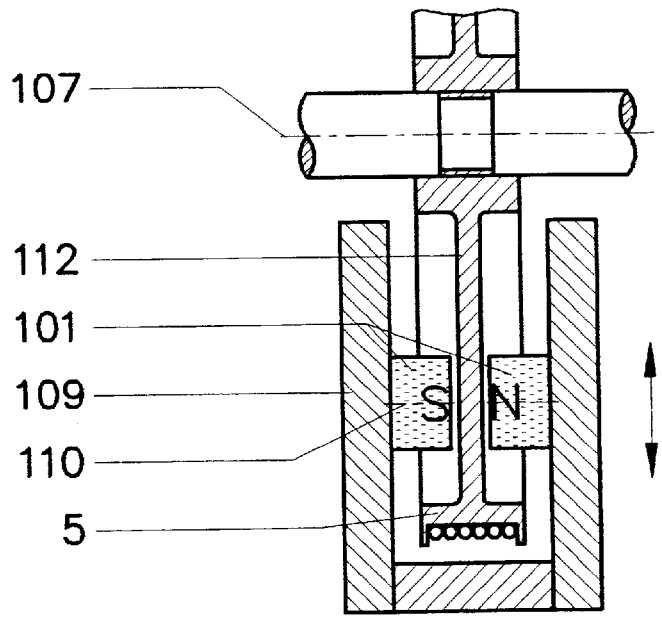

Referring now to the detail view in FIG. 1a, particularly when the cable drum has a drum disk 112 which is disposed at a central location in the axial direction of the cable drum, the braking magnet or magnets 101 can be directed from both sides in alignment in the axial direction towards the disk 112. The first and second magnets 101 which are directed with different poles towards the disk 112 can be fixed on the insides of a generally U-shaped magnet holder indicated at 109 which embraces the radially outer end of the cable drum 5 and which in such an arrangement is displaceable in particular also in a radial direction, for varying the braking force applied to the cable drum.

Figure 1B:
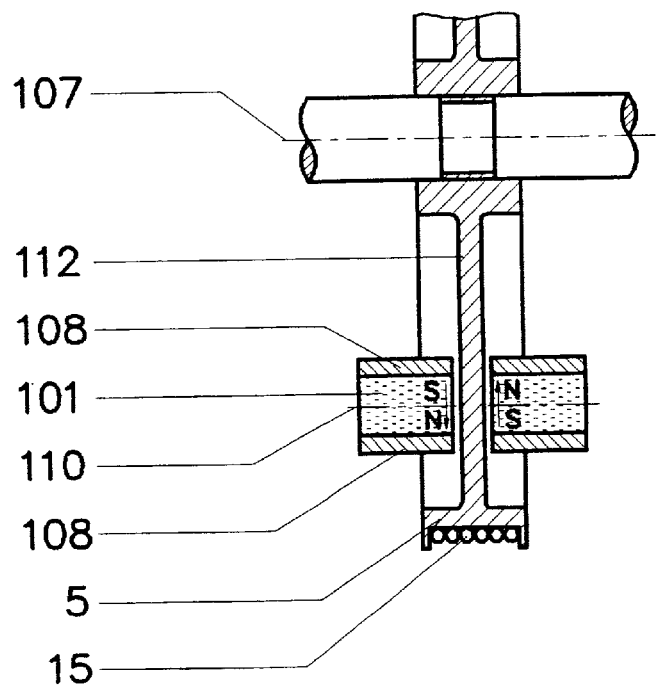

The detail view in FIG. 1b also shows retardation or braking magnets 101 which are directed from both axial directions towards the disk 112 but which, in contrast to the magnets 101 in FIG. 1a, have a magnetisation axis as indicated at 110 which is parallel to the drum disk 112, more specifically in the radial direction thereof, and which are each surrounded on the outside by pole pieces 108 of a generally plate-like configuration.

Figure 1C:
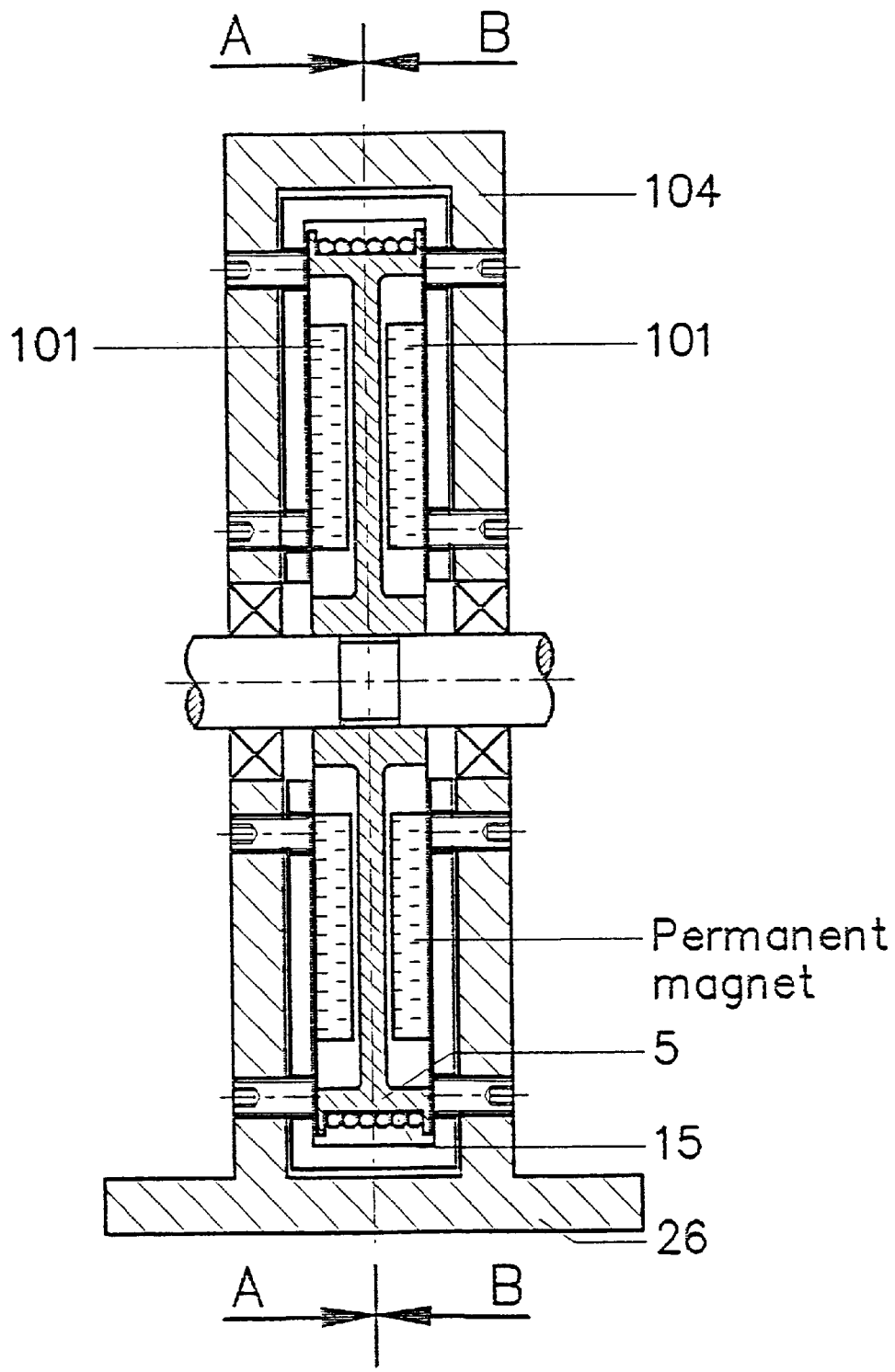

In contrast the views in FIGS. 1c and 1d show a structure in which there are four pairs of braking magnets 101 which are arranged on respective ones of the two sides of the disk 112 of the cable drum 5, more specifically, a respective pair in each quadrant with respect to the axis 107 of the cable drum 5, as can be clearly seen from FIG. 1d. In this arrangement, the magnets 101 are respectively arranged in the interior of one or more pole shoes or pieces 108 which embrace the cable drum 5 at a radially outward position and which serve for flux amplification purposes and which more particularly for example consist of soft iron. In that respect, the pole piece 108 preferably comprises a closed box-like profile member with a through bore in transverse relationship to its plane in the center for the shaft of the cable drum 5 to be passed there through.

The pole piece can be fixed by means of adjusting screws in an axial direction on the surrounding housing 104 and is adjustable thereby in an axial direction relative to the cable drum 5.

Looking now in greater detail at FIG. 1d, reference 130 therein denotes a sliding or contact roller which at the point of impingement of the measuring cable on the cable drum 5, presses the measuring cable against the outside surface of the cable drum. In the further movement of the measuring cable on to the cable drum 5, in particular in the subsequent quadrant, the measuring cable is further prevented from lifting away from the cable drum 5 by means of a sliding or contact shoe 114 which bears at the external contour against the outside of the measuring cable as it is wound on to the cable drum 5.

In contrast to the above-described embodiment shown in FIGS. 1 through 1d, in the structure shown in FIG. 2 the one or more retardation or braking magnets 101 are arranged in the drum disk 112 directly radially within the winding cylinder 105 of the cable drum 5, and face outwardly towards a wall of the housing member 26, which is at a small spacing in opposite relationship to the magnets 101. In this case also, a raised portion corresponding to the raised portion 113 in FIG. 1 forms a contact-preventing means, but in this case the raised portion is provided on the cable drum 5.

Figure 4A:
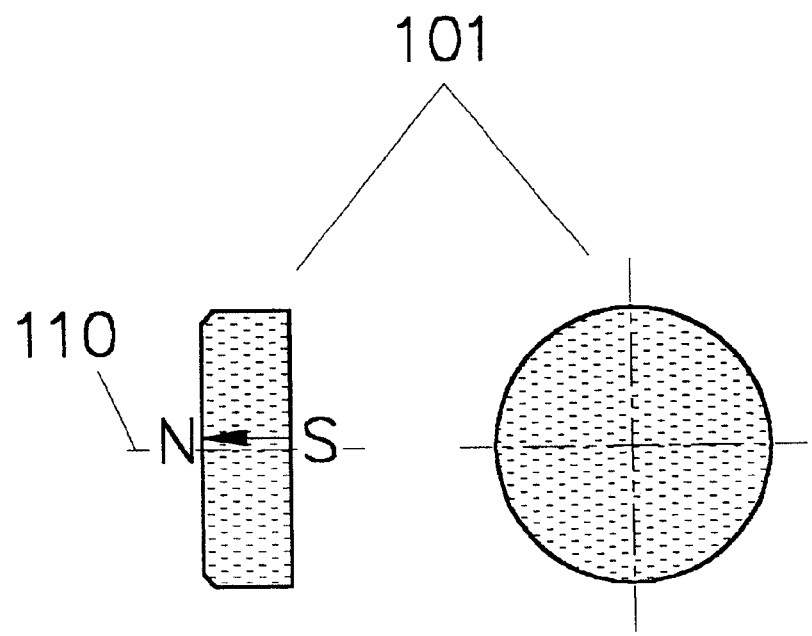
FIGS. 4a and 4b show detail views of the braking magnets.
Figure 4B:
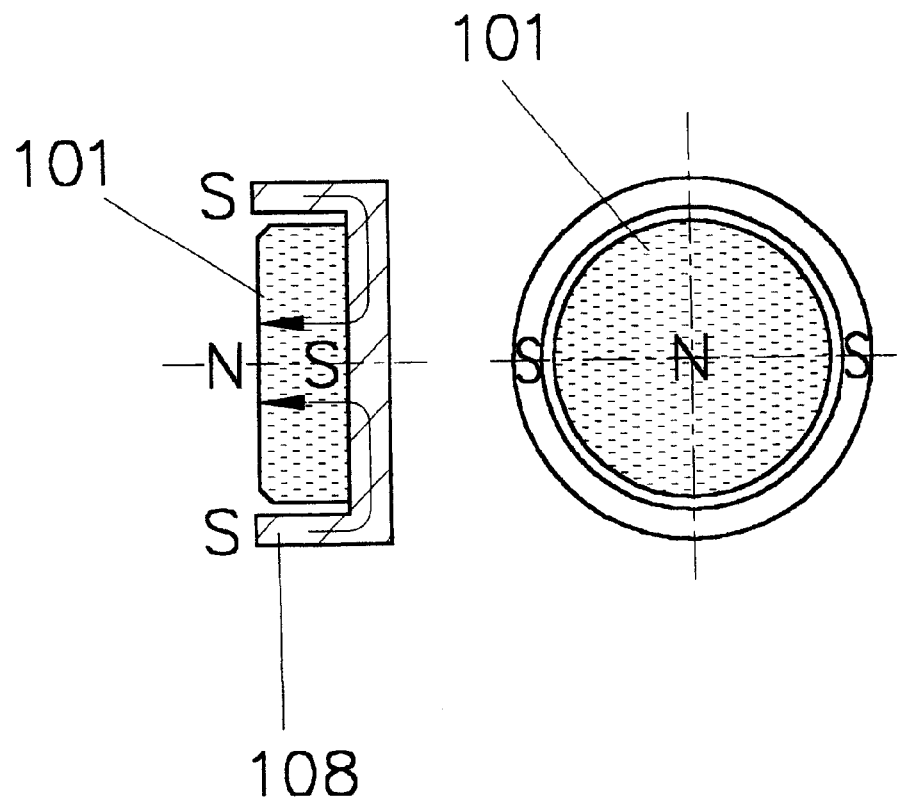

Both cases involve using magnets in the form of retardation or braking magnets 101 which are shown as a front view and a side view in FIGS. 4a and 4b in two different versions. It will be apparent in this respect that in both cases the actual braking magnet 101 is magnetised in the through direction, through the thickness of the disk, so that the one face represents the North pole and the other represents the South pole. In the embodiment shown in FIG. 4b, the South pole and the periphery of the disk-shaped magnet are covered by a cup-shaped, one-piece pole shoe or pole piece 108 of soft iron, whereby in functional terms the South pole of that magnet is displaced insofar as the field lines are guided outside the South pole through the pole piece 108 to the open front side of the cup-shaped pole piece 108.

Reference will now be made to FIGS. 5a through 5i showing different forms of magnetisation of magnets in disk shape. In this respect, FIG. 5a corresponds to the structure shown in FIGS. 4a and 4b, wherein the entire face of the disk corresponds to a pole, that is to say a North pole or a South pole. The axial direction of the disk is thus the magnetisation axis. In contrast thereto in FIG. 5b the magnetisation axis is parallel to the plane of the disk.

Figure 5A:
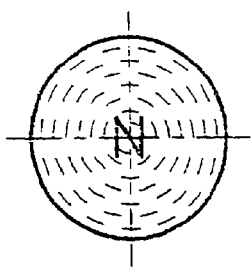
FIGS. 5a through 5i show magnets magnetised in different ways.
Figure 5A:
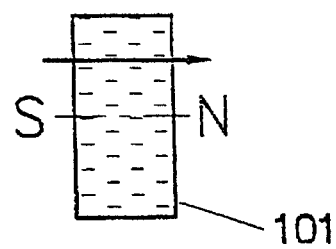
Figure 5B:
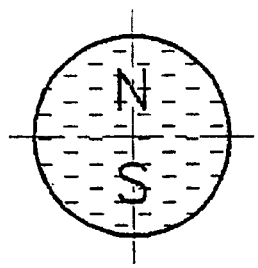
Figure 5B:
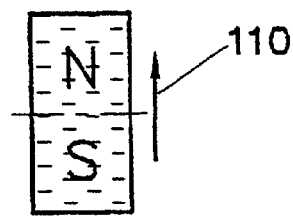
Figure 5C:
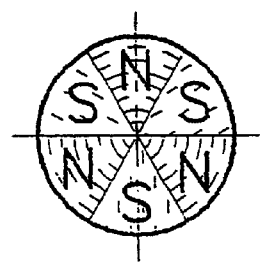
Figure 5C:
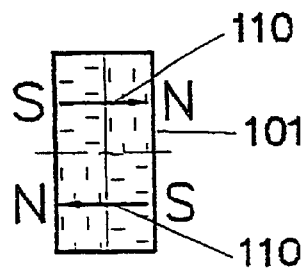

In a structure as shown in FIG. 5c, the magnetisation axis 110 is admittedly also parallel to the thickness dimension of the disk, but the disk periphery is subdivided into a plurality of sectors, in this case six, and each sector is magnetised separately in a direction through the disk, but with a polarity which alternates in the peripheral direction, so that on one face there are six different, mutually alternate poles, distributed over the periphery of the disk, and the same configuration on the opposite face, being magnetised axially through the disk in a sector configuration.

Figure 5D:
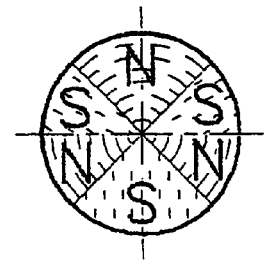
Figure 5D:
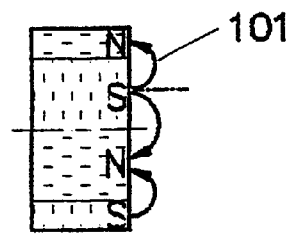

Looking at FIG. 5d, shown therein is a similar mode of magnetisation, which differs in a sector configuration, in the peripheral direction, but in this case the disk of the magnet is not magnetised there through in the axial direction thereof, but only one of the faces is overall magnetised so that this magnetised face can be considered as a succession, viewed in the peripheral direction, of bar magnets of different shapes, this therefore entailing lateral magnetisation, in a sector configuration, on one surface of the disk.

Figure 5E:
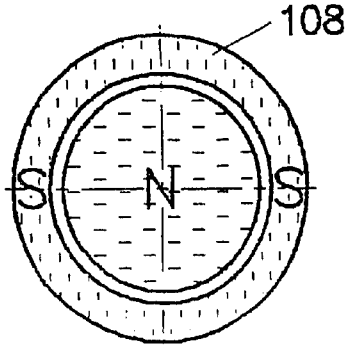
Figure 5E:
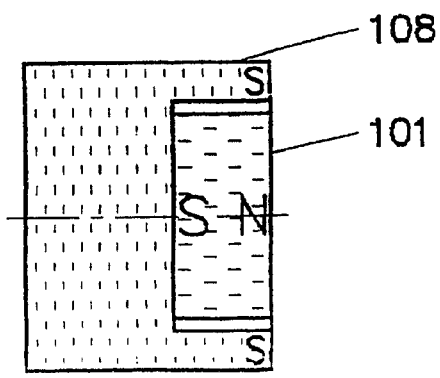
Figure 5F:
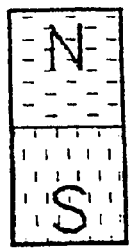
Figure 5F:
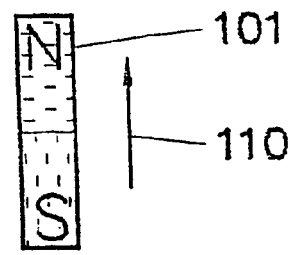

FIG. 5e shows the magnet of FIG. 5a but surrounded by a generally cup-shaped pole piece as is already shown in the lower part of FIG. 4 and as has been described hereinbefore.

FIGS. 5b through 5i in contrast show magnets in the form of bar magnets. In the structure shown in FIG. 5f, the longitudinal direction of the bar is the magnetisation direction, that is to say, with the North pole at a narrow end of the bar and the South pole at the opposite narrow end.

Figure 5G:
Figure 5G:
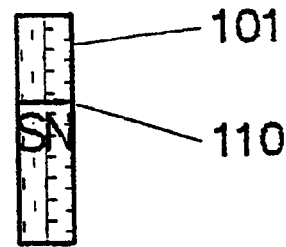

In FIG. 5g in contrast the magnetisation. direction as indicated at 110 extends transversely with respect to the longitudinal extent of the bar magnet, in other words, with the North pole on the one wide side of the bar magnet and with the South pole on the other wide side.

Figure 5H:
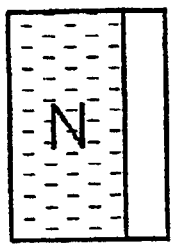
Figure 5H:
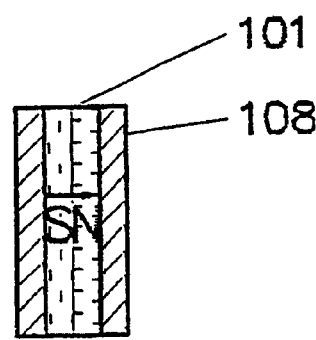

A similar consideration also applies to the magnet shown in FIG. 5h, which is additionally surrounded by a generally U-shaped pole piece 108, preferably of soft iron, whose limbs which terminate freely are disposed parallel to the South pole and North pole faces.

Figure 5I:
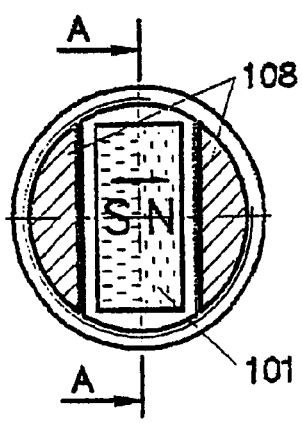
Figure 5I:
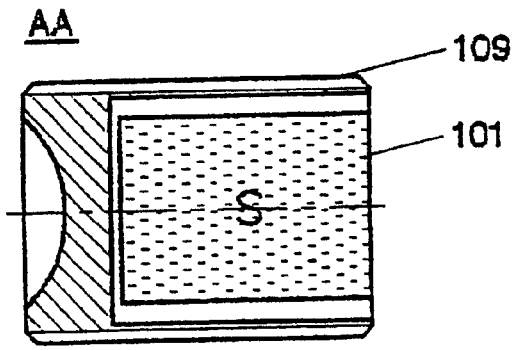

Such a structure is also shown in principle in FIG. 5i in which however, as viewed in plan view, the outside contours of the pole piece 108 are convexly curved so that the resulting configuration is a generally somewhat round external periphery.

In that way, the magnet 101 and the two pole pieces 108 can be jointly fitted into a cylindrical bore in the end of a magnet holder as indicated at 109 in the right-hand part of FIG. 5h, the holder 109 at its outer periphery which is also cylindrical having a male screwthread (shown but not referenced) for screwing into a fixing opening.

FIG. 6 again shows a sectional view of an embodiment of a measuring cable travel sensor according to the invention, along the axis of rotation as indicated at 107.

In this embodiment also, the cable drum indicated at 5 is rotatably supported by means of its shaft and bearings 128 in side walls of a profile member 26 which serves as a housing.

In contrast to the structures shown in FIG. 1 or FIG. 2, the spoke disk 112 of the cable drum 5 is arranged centrally in the axial direction relative to the winding cylinder 105 whose outside surface which constitutes the winding surface 106 on to and from which a measuring cable as indicated at 15 is suitably wound. In the lower half of FIG. 6, arranged at the inside surface of the winding cylinder 105 in opposite relationship with respect to the spoke disk 112 are first and second holding magnets 102 in the form of bar magnets, which face with opposite poles towards each other, that is to say towards the drum disk 112. In this arrangement the holding magnets 102 preferably project somewhat in the longitudinal direction beyond the outside surfaces of the cable drum 5.

In order not to cause the cable drum 5 to suffer from an unbalance due to the presence of the holding magnets thereon, an identical pair of holding magnets 102 is also arranged on the radially inwardly disposed surface of the winding cylinder 105 on the side in opposite relationship with respect to the axis of rotation 107 of the cable drum 5. Fixing of the magnets is preferably effected by adhesive means.

It is also possible to envisage making an opening through the drum disk 112 in the longitudinal direction, for example by boring or drilling, and inserting there through a single bar magnet to act as a holding magnet 102, instead of the two mutually aligned bar magnets illustrated.

Figure 6:
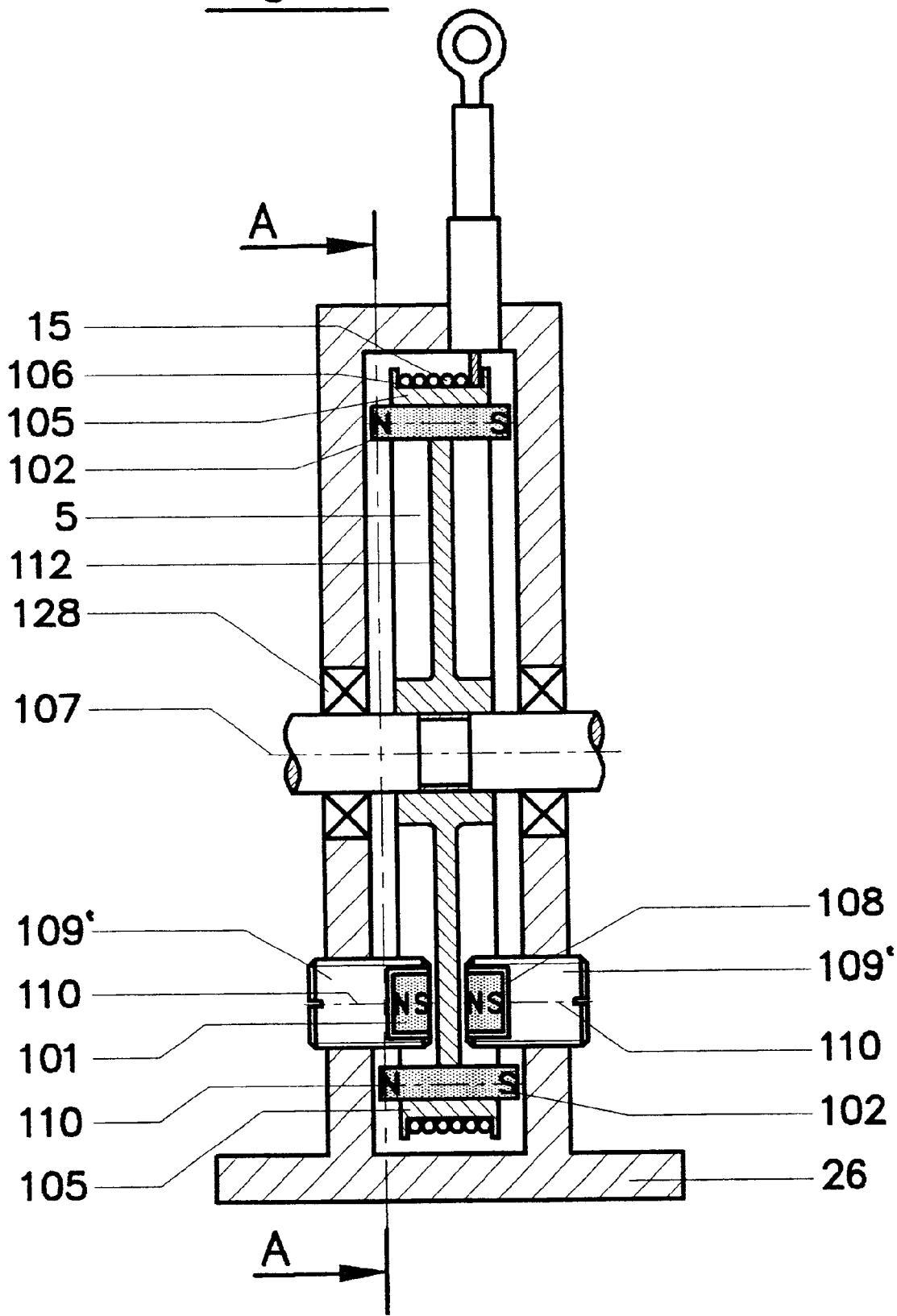
FIG. 6 is a view in section through a further embodiment of a measuring cable travel sensor according to the invention.

It will be appreciated however that in addition the lower half of FIG. 6 also shows a pair of retardation or braking magnets indicated diagrammatically at 101. They are arranged however at the side walls of the housing member 26 and extend, radially within the winding cylinder 105, to a position in close proximity to the disk 112 of the cable drum 5. For the purposes of adjustability of the air gap there between, the two magnets 101 which once again are arranged with their magnetisation direction parallel to the axis of rotation 107 and which are directed towards each other with opposite poles, are each arranged in respective recesses or depressions in the mutually facing ends of magnet holders 109 having a male screwthread, by means of which they can be screwed into a suitable, axially extending screwthreaded bore through the wall of the housing member 26, so that they are adjustable in regard to the magnitude of the air gap.

In this case, to increase the magnet force, the two magnets 101 are each disposed in a generally cup-shaped pole piece 108 whose open side is in this case also directed towards the drum disk 112 and thus towards the respective mutually oppositely directed magnet 101.

Figure 6A:
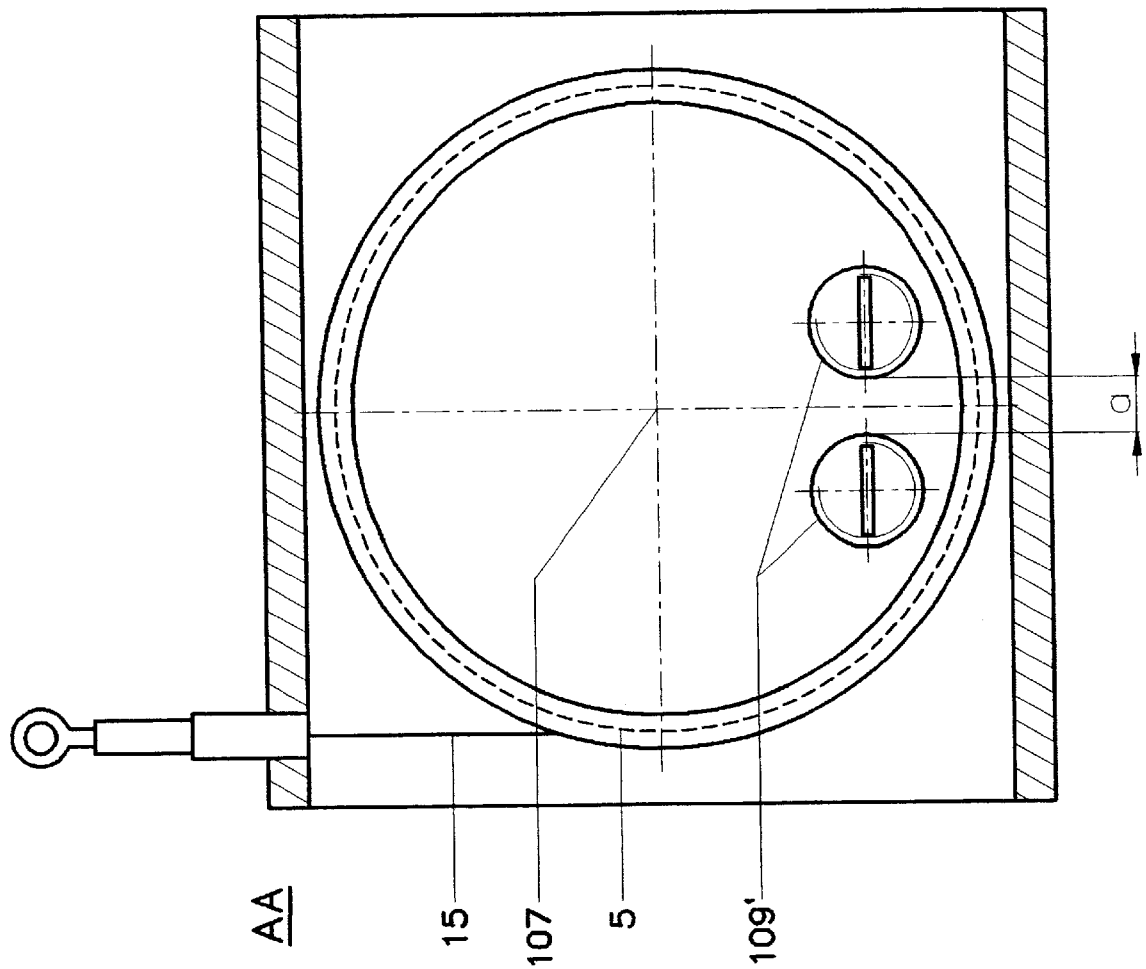
FIG. 6a is a front view of the FIG. 6 structure.

Reference will now be made to FIG. 6a illustrating a side view of the FIG. 6 structure and showing the possibility of arranging not just one but a plurality of such magnets 101, in a peripherally distributed array, in magnet holders 109 in the walls of the housing member 26. A minimum spacing indicated at a in FIG. 6a must be observed there between in order to prevent adverse mutual influencing of the magnets 110.

FIG. 6a further shows that it is not absolutely necessary to provide for uniform peripheral distribution of the magnets 101 or magnet holders 109.

It will be noted in this respect that for reasons of enhanced clarity of the drawing the holding magnets 102 are not illustrated here.

Figure 7:
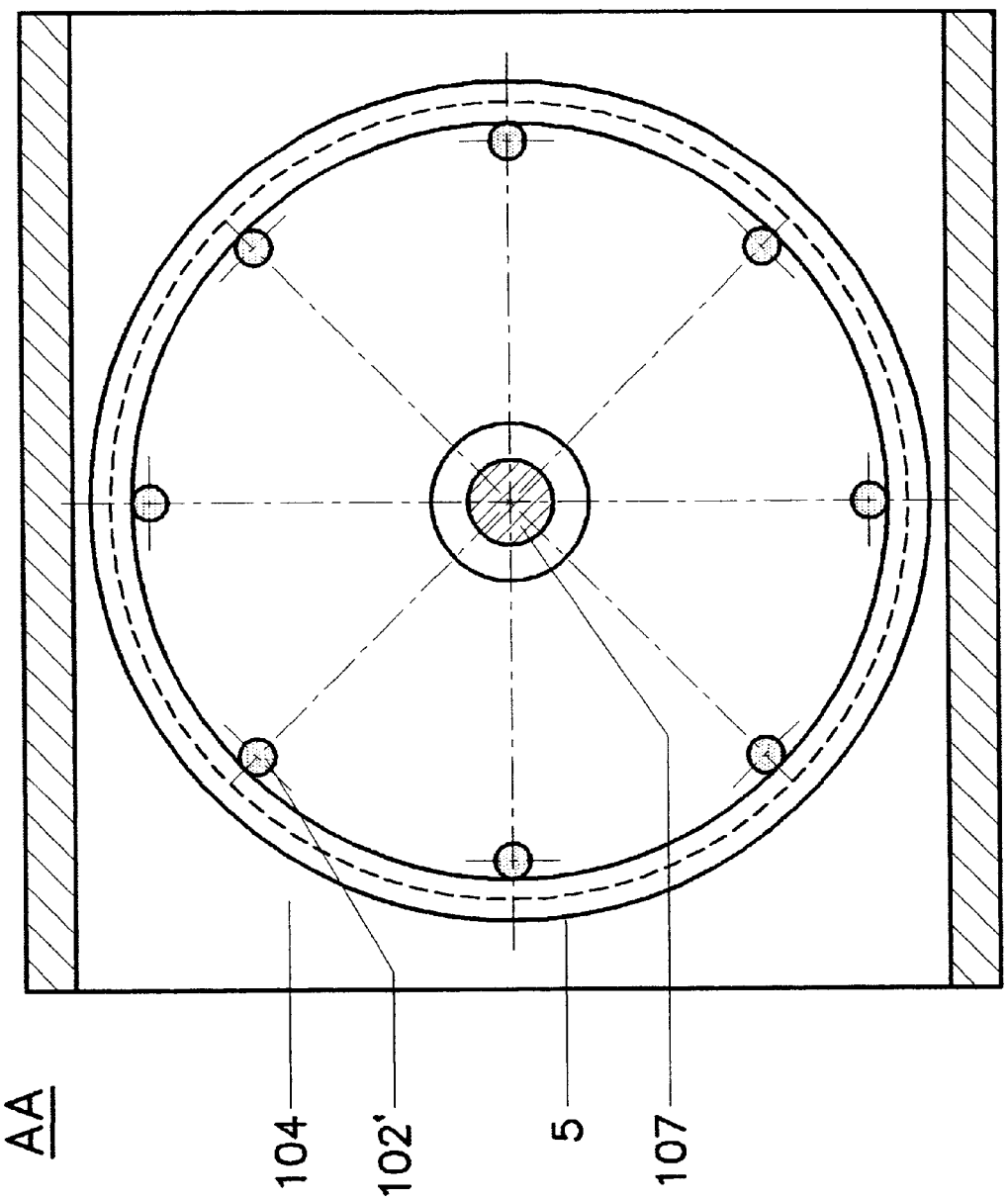
FIG. 7 is a view of the cable drum from FIG. 6, and FIGS. 8, 8a, 8b and 8c show further configurations of the measuring cable travel sensor according to the invention.

Attention is now directed to FIG. 7 showing another front view of the cable drum 5 along line A—A in FIG. 6.

By virtue of suitable positioning of the section, FIG. 7 shows exclusively the holding magnets 102' on the cable drum 5, there being eight thereof arranged at respective spacings of 45°. This view is intended to make it clear that, in the event of selecting sufficiently strong holding magnets 102', those magnets can serve as combination magnets if the air gap thereof relative to the adjacent housing and in particular relative to the side wall of the housing member 26 is of the correct size. In that case, it is possible entirely to omit additional separate braking or retardation magnets as the holding magnets perform both a holding and a braking function.

Irrespective thereof all the illustrated structures only ever function properly on the basic assumption that in the case of the holding magnets the measuring cable 15 which is subjected to the action of the magnets must comprise a magnetisable material or, in the case of the braking or retardation magnets, the influenced component, that is to say when the braking magnets are arranged on the cable drum this being the housing or when the braking magnets are arranged on the housing this being the cable drum, at least in the influenced region thereof, must comprise electrically conductive material or must be electrically conductively coated.

When using combination magnets as indicated above, those conditions apply cumulatively.

Figure 8:
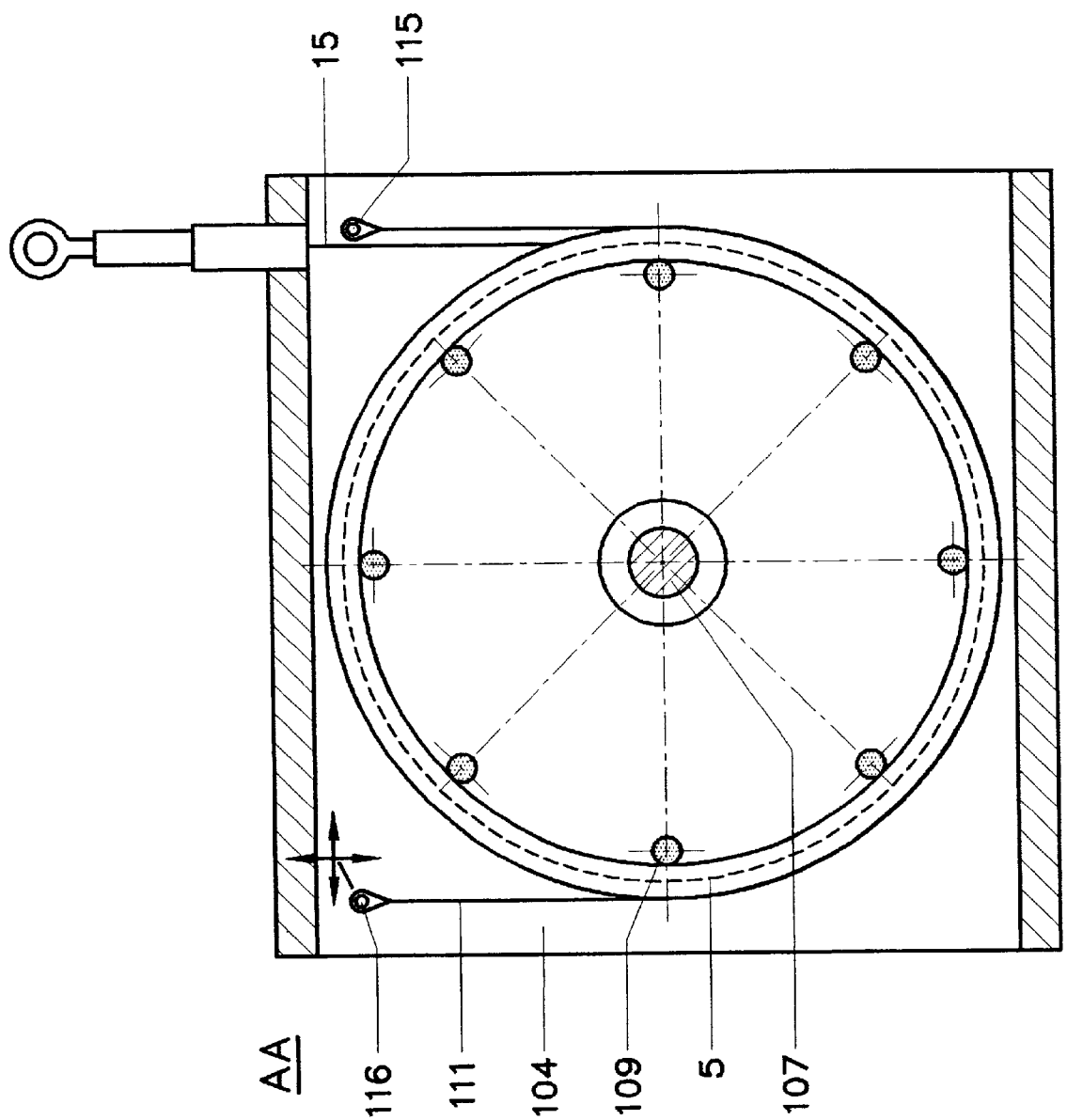
Figure 8A:
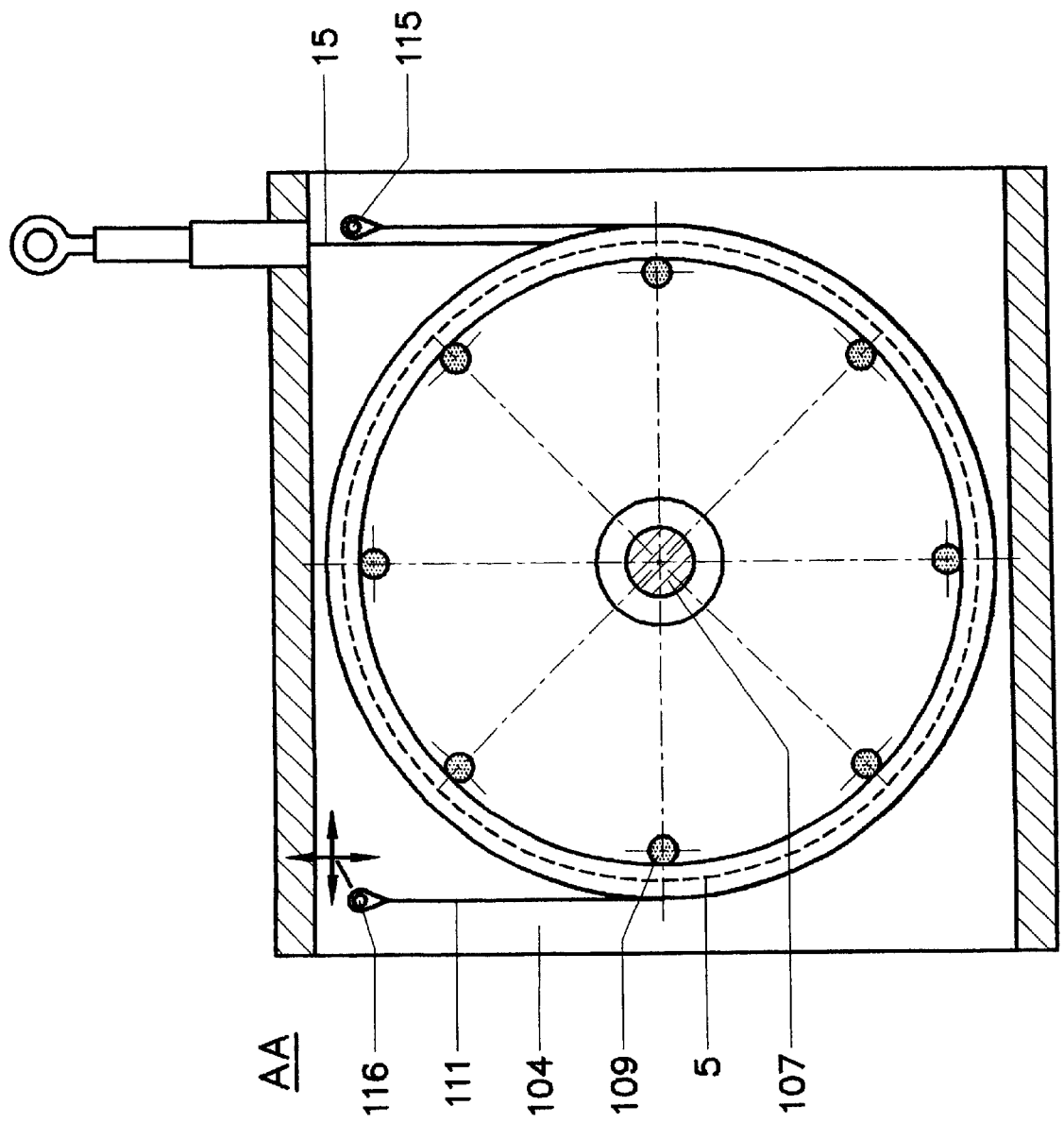

Reference is now directed to FIG. 8a showing a structure which differs from FIG. 7 by virtue of the inclusion of a sliding or friction band or belt indicated diagrammatically at 111. This sliding belt of finite length generally comprises any suitable material such as a textile material or other slidable, non-abrasive material, for example felt or other material which has good oscillation-damping properties. The band or belt 111 is laid around a part of the cable drum 5, that is remote from the cable entrance, more particularly as illustrated extending over a region of about 180°. For that purpose, one end of the sliding belt or band 111 is secured to a fixed point indicated at 115 near to the cable entrance on the housing while the other end is fixed to the housing about an adjustment point 116 on the opposite side of the axis of rotation 107 of the cable drum 5. In that case, the displacement point 116 can be displaceable both tangentially and also radially with respect to the axis 107 of the cable drum 5, more particularly in first and second mutually perpendicular directions, in each case in transverse relationship with the axis of rotation 107.

In that case, the contact between the sliding belt 111 and the outwardly facing surface of the winding of measuring cable on the cable drum 5, such contact being loose or totally absent in the initial condition of the arrangement, can be adjusted in order to intensify or slacken such contact, for the purpose of preventing the measuring cable from rising up or climbing up, that is to say lifting radially outwardly away from the peripheral or winding surface of the cable drum 5, in case the holding magnets 102 or the combination magnets 102' should not be sufficient to achieve that aim. That radial outward movement of the measuring cable can already be impeded by virtue of the fact that there is essentially no contact between the sliding belt 111 and the outwardly facing surface of the winding or measuring cable on the cable drum, as such contact comes into existence only when the measuring cable moves radially outwardly in the above-mentioned, undesired fashion. Consequently the spacing which is possibly present between the outside surface of the turns of measuring cable on the cable drum and the inside surface of the band 111 is to be as small as possible, in an ideal case approximating to zero.

Figure 8B:
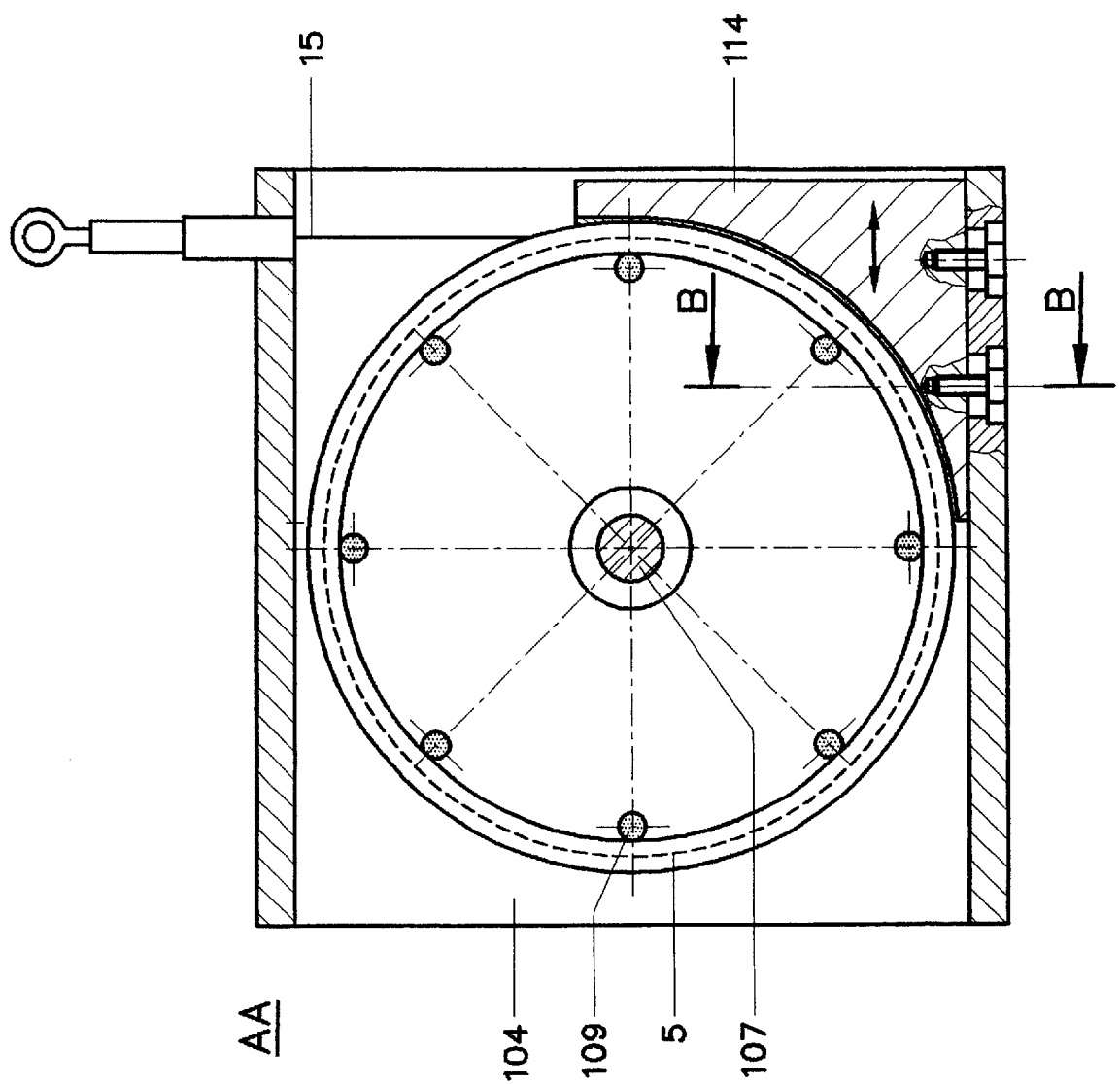
Figure 8B:
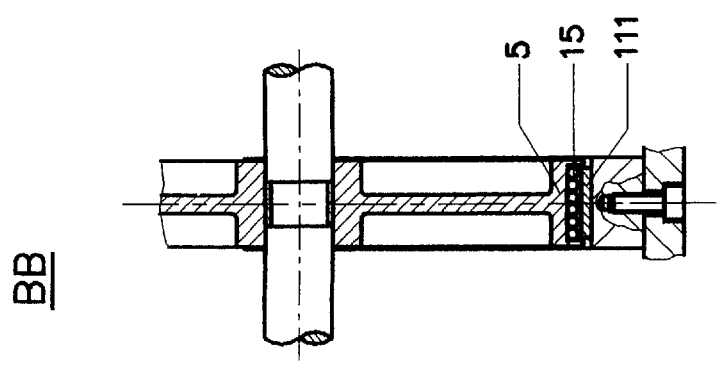

FIG. 8b in turn shows a structure in which the sliding band 111 is not laid loosely in the form of a belt around the cable drum with the measuring cable wound thereon, but is in the form of a lining carried on a slide or friction shoe 114. The contour configuration thereof, that is towards the cable drum 5, corresponds to the external contour of the cable-carrying drum 5. The shoe 114 extends through about 90° around the external peripheral surface of the cable drum 5, more specifically, in the winding-on direction, in the segment adjoining the point at which the measuring cable passes on to the cable drum 5. The shoe 114 is fixed to the housing 104, being in particular screwed thereto, and is so positioned that its lining consisting of the sliding band 111 has the desired contact with the external surface of the winding of measuring cable on the cable drum 5, as shown by the sectional view BB in FIG. 8b.

Figure 8C:
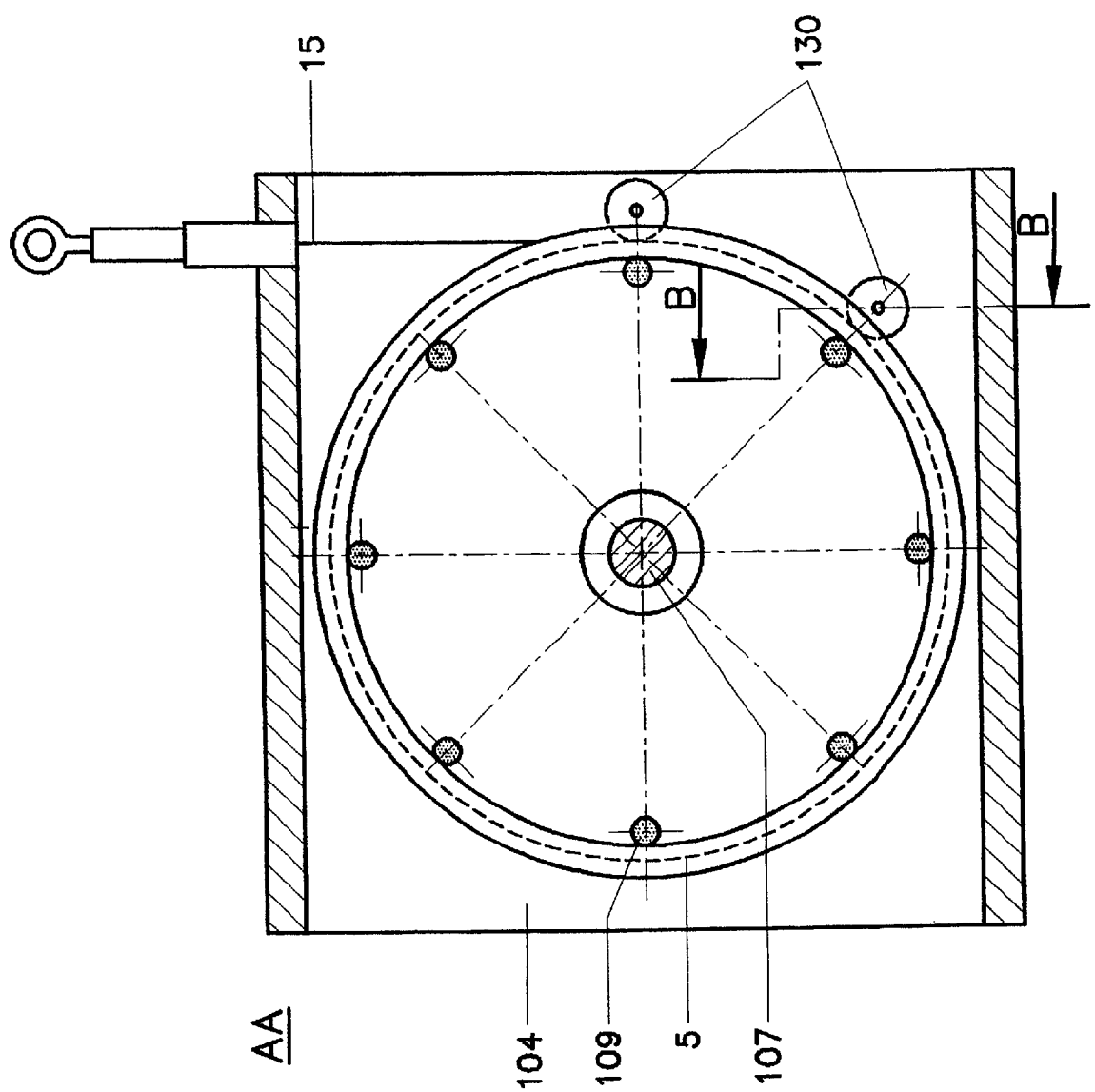
Figure 8C:
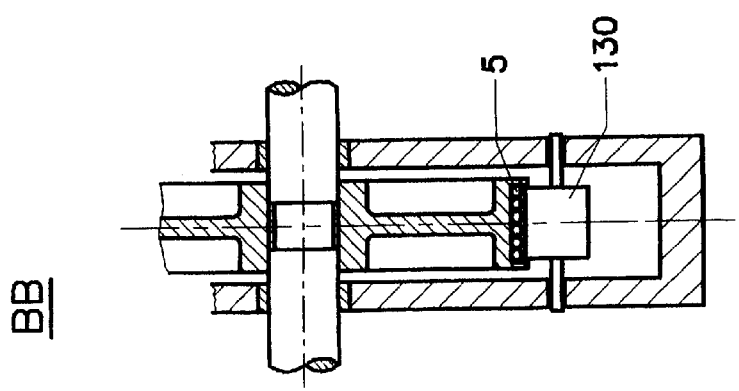

Referring now to FIG. 8c, the structure therein differs from that shown in FIG. 8b in that, instead of the shoe 114 in FIG. 8a, over the first quadrant of the measuring cable 15 to be wound on to the cable drum 5, two or even more sliding rollers or contact rollers 130 which are supported in the housing 104 bear from the outside of the wound-on measuring cable 15 on the drum against the measuring cable, and thus, by contact with the outside surface of the measuring cable, prevent the measuring cable from lifting away from the external periphery of the cable drum 5.

It will be seen from the foregoing description of the preferred embodiments of the invention that the measuring cable travel sensors, in spite of enjoying a sufficiently strong biassing effect for urging the cable drum in the direction of winding the measuring cable on to the cable drum, can avoid the cable drum from being accelerated to an excessive extent when the measuring cable is being wound on to it. The measuring cable is also prevented from moving outwardly away from the winding surface of the cable drum or climbing up over turns of measuring cable already wound on the drum. In both cases the primary functions of the measuring cable travel sensors do not suffer any adverse effect while the service life of the sensors is also at least maintained.

It will be appreciated that the above-described embodiments of the invention have been set forth solely by way of example and illustration of the principles of the invention and that various other modifications and alterations may be made therein without thereby departing from the spirit and scope of the invention.

What is claimed is:

1. A measuring cable travel sensor, comprising:

a housing, a cable drum comprising a winding cylinder portion having an external winding surface, means rotatably mounting the cable drum in the housing, a measuring cable adapted to be wound on to and unwound from the cable drum, at least one braking magnet arranged at a point non-rotatable with said cable drum and adapted to act brakingly against a direction of rotation of said drum in contact-less manner magnetically on the cable drum at an eccentric region of action thereof, the cable drum, at least in said region, comprising electrically conductive material; and a sliding belt extending around at least a part of said external winding surface.

2. A measuring cable travel sensor as set forth in claim 1, further including a friction shoe wherein said sliding belt is mounted on said friction shoe.

3. A measuring cable travel sensor, comprising:

a housing, a cable drum, means rotatably mounting the cable drum in the housing, a measuring cable adapted to be wound on to and unwound from the cable drum upon rotational movement thereof, a spring engaging the cable drum and operable to urge it in the winding-on direction, a rotary angle sensor connected to the housing and operable to detect rotational movement of said drum in said housing, and magnetically operative retardation means adapted to control said rotational movement of said drum at least in the winding-on direction of rotation thereof in a condition of contact-free magnetic co-operation; and a sliding belt extending around at least part of an external winding surface of said drum.

4. A measuring cable travel sensor, comprising:

a housing;

a cable drum comprising a cylindrical, winding retaining means;

means for rotatable mounting said cable drum in said housing;

at least one magnetic braking means for providing a magnetic force against a direction of rotation of said drum, wherein said at least one magnetic braking means is positioned proximal to a radially outward region of said cylindrical, winding retaining means; and a sliding belt extending around at least a part of an external winding surface of said winding retaining means.

* * * * *